United States Patent
Wiese et al.

(10) Patent No.: US 6,351,727 B1
(45) Date of Patent: *Feb. 26, 2002

(54) ERROR CONCEALMENT IN DIGITAL TRANSMISSIONS

(75) Inventors: Detlev Wiese, Neufahrn; Robert Sedlmeyer, Ismaning, both of (DE)

(73) Assignee: Starguide Digital Networks, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/567,647

(22) Filed: May 9, 2000

Related U.S. Application Data

(63) Continuation of application No. 09/345,546, filed on Jun. 29, 1999, now abandoned, which is a continuation of application No. 08/778,949, filed on Jan. 6, 1997, now Pat. No. 6,006,173, which is a continuation of application No. 08/648,484, filed on May 15, 1996, now abandoned, which is a continuation of application No. 07/962,216, filed on Jan. 26, 1993, now abandoned, which is a continuation of application No. PCT/EP92/00754, filed on Apr. 3, 1992.

(30) Foreign Application Priority Data

Apr. 5, 1991 (DE) .......................................... 41 11 131

(51) Int. Cl.⁷ ............................................. G01L 11/00
(52) U.S. Cl. ...................................... 704/201; 704/500
(58) Field of Search ................................ 704/201, 200, 704/226, 204, 227, 228, 500, 501, 503

(56) References Cited

U.S. PATENT DOCUMENTS

| | | | | |
|---|---|---|---|---|
| 3,626,295 A | * | 12/1971 | Sabrui .......................... | 370/324 |
| 4,494,238 A | * | 1/1985 | Groth et al. .................. | 375/141 |
| 4,821,260 A | * | 4/1989 | Klank .......................... | 370/345 |
| 4,831,624 A | * | 5/1989 | McLaughlin et al. ........ | 714/781 |
| 4,907,277 A | * | 3/1990 | Callens et al. ............... | 704/202 |
| 5,144,431 A | * | 9/1992 | Citta et al. ................. | 348/400.1 |
| 5,349,699 A | * | 9/1994 | Erben et al. ............. | 455/186.1 |

* cited by examiner

*Primary Examiner*—Richemond Dorvil
(74) *Attorney, Agent, or Firm*—McAndrews, Held & Malloy, Ltd.; Robert C. Ryan

(57) ABSTRACT

A method is provided for transmitting or storing, over an interference affected channel, digital audio signals that have been subjected to data reduction, resulting in a reduced data, digital audio signal that is present in at least one of the time domain and spectral domain, depending on source coding. An interfered-with signal section is detected in the reduced data, digital audio signal at a receiving end. The interfered-with reduced data, digital audio signal section is masked by one of (a) muting only interfered-with spectral values or subbands, or groups of spectral values or subbands in the signal section and (b) replacing only interfered-with spectral values or subbands, or groups of spectral values or subbands in the signal section with a signal component from the same channel or an adjacent channel including at least one of time domain sampled values, spectral domain sampled values, scale factors, and control information, depending on the source coding of the reduced data, digital audio signal.

46 Claims, 1 Drawing Sheet

ERROR CONCEALMENT IN DIGITAL TRANSMISSIONS

CROSS REFERENCE TO RELATED APPLICATIONS

This is a continuation of Ser. No. 09/345,546 filed Jun. 29, 1999 now ABN which is a continuation of Ser. No. 08/778, 949, filed Jan. 6, 1997, which issued as U.S. Pat. No. 6,006,173, which is a continuation of Ser. No. 08/648,484, filed May 5, 1996, now abandoned, which is a continuation of Ser. No. 07/962,216, filed Jan. 26, 1993, which claims priority through PCT/EP92/00754, filed Apr. 34, 1992, which claims priority through German Patent Application P4111131.1, filed Apr. 6, 1991.

BACKGROUND OF THE INVENTION

The invention relates to a method of transmitting or storing, over an interference affected channel, digital audio signals, wherein transmission errors are detected at the receiving end and corrected if necessary or masked, with the masking being effected in that the interfered-with signal section is muted or replaced by a signal preceding the interfered-with signal section in the same channel or by a synchronous, not interfered-with signal section of an adjacent channel. Such a method is disclosed in German Patent DE 3,638,922.C2.

In digital audio signal transmissions and storage, the received and read-out audio signals, if they contain bit errors, may either be not decodable at all or not decodable to in part after all error detection and error correction methods have been exhausted. In that case, it is the custom to switch to a decoder for muting over a broad band in such a way that for a certain time period the entire signal is set at 0. In the case of digital audio signals transmitted by radio, this case occurs relatively frequently at the fringes of the reception area which is extremely annoying particularly in connection with mobile reception. The same applies for audio signal storage if the tape material or audio heads are worn to a degree that exceeds a tolerance value.

To reduce the annoying effect of missing signals in radio transmissions, German Patent DE 3,638,922.C2 discloses a mutual offset in time between the left and right stereo channels and, if there is an uncorrectable signal interference, placing the complementary stereo information transmitted at an earlier or later point in time instead of the interfered-with original information. Although the complementary stereo information is not identical with the associated, interfered-with original information, but is connected with it only by way of left-right correlation, such a substitution is acceptable in any case for a short period of time since direction and distance perception as well as the perception of spatial relationships are subject to a certain inertia in the human ear. However, if such a masking technique is employed for a longer period of time, the stereophonic impression is lost, since the masking always covers the full bandwidth of the interfered-with signal and therefore also replaces spectral signal components that did not suffer interference.

SUMMARY OF THE INVENTION.

In contrast thereto, it is the object of the invention to provide, in a method of the above-mentioned type, a subjectively better masking of errors which permits better reconstruction of the interfered-with original audio event and, particularly also during longer use, maintains the stereophonic impression.

The above and other objects are accomplished according to the invention by the provision of a method of transmitting or storing, over an interference affected channel, digital audio signals that have been subjected to data reduction to result in a reduced data, digital audio signal that is present in at least one of the time domain and spectral domain, depending on source coding, the method comprising the steps of: detecting an interfered-with signal section in the reduced data, digital audio signal at a receiving end; and masking the interfered-with reduced data, digital audio signal section by one of (a) muting only interfered-with spectral values or subbands, or groups of spectral values or subbands in the signal section and (b) replacing only interfered-with spectral values or subbands, or groups of spectral values or subbands on the signal section with a signal component from the same channel or an adjacent channel including at least one of time domain sampled values, spectral domain sampled values, scale factors, and control information, depending on the source coding of the reduced data, digital audio signal.

The invention is based on the consideration of intentionally muting, repeating, estimating or replacing for a certain period of time only those spectral components of a complete audio signal that have actually experienced interference. The invention takes advantage of the fact that reduced data, digital audio signals (i.e., digital audio signals subjected to known data reduction processes) are present in the time and spectral domains, depending on whether they are subdivided into subbands (subband coding) or into spectral values (transformation coding). The following masking strategies can be employed:

1. Muting

With this masking strategy, only those spectral components of the interfered-with signal are muted which have actually been interfered with. Depending on the source coding method employed, these may be individual subbands or spectral values or groups of subbands or spectral values of a digital audio signal that has been subdivided into n subbands or spectral values, with n being a value equal to or greater than 1.

2. Repeating

With this masking strategy, components of the same channel signal are employed as substitutes for the interfered-with signal components, which hereinafter will be called "repeating". Depending on the source coding method employed, the components to be repeated may be individual subbands or spectral values or groups of subbands or spectral values of a digital audio signal that has been subdivided into n subbands or spectral values, with n again being a value equal to or greater than 1. Again depending on the source coding method employed, these components may be composed of synchronous or spectral sampled values as well as control informations or scale factors. The repetition may also be effected several times.

3. Left-Right Substitution

In this case, synchronous components of the audio signal that are present without interference or in processed form in the adjacent channel are employed as substitutes, which will hereinafter be called "left-right substitution". The components to be replaced may be, as in the case of repeating and depending on the source coding method employed, individual subbands or spectral values or groups of subbands or spectral values of an audio signal that has been subdivided into n subbands or spectral values, with n again being a value equal to or greater than 1. Again depending on the source coding method employed, these components may be composed of time domain or spectral domain sampled values as well as of control information or scale factors.

4. Estimating

With this masking strategy, not interfered-with or processed components of the same channel signal or of the signal from the adjacent channel are utilized by way of estimation (e.g. interpolation) to determine the components required to substitute interfered-with components. Due to the probability of combinations in the time domain or the spectral domain, a conclusion can be drawn from the use of non-interfered-with or processed spectrally or timely adjacent components of the same channel signal or of a signal from the adjacent channel as to the original content of interfered-with components that must be replaced. Depending on the source coding method employed, the components to be estimated may be individual subbands or spectral values or groups of subbands or spectral values of an audio signal that has been subdivided into n subbands or spectral values, with n here again being a value equal to or greater than 1. Again, depending on the source coding method employed, these components may be composed of time domain or spectral domain sampled values as well as of control informations or scale factors. Various methods for fading the signals in and/or out can be employed for the above-mentioned masking strategies. That means that the changeover from the not interfered-with component to the replaced or muted component and/or from the replaced or muted component to the not interfered-with component is made over a certain transition time and with a certain transition function so that sudden transitions are avoided.

All of the above-mentioned masking strategies can be combined with one another if required.

In connection with the described masking strategies, the invention takes advantage of certain characteristics of the human sense of hearing. In the case of muting, repeating or estimating, the auditory characteristics with respect to timely and/or simultaneous masking thresholds are utilized to the extent that these masking measures remain substantially inaudible or hidden as long as they do not exceed a certain time, spectrum and level range.

In the case of the left-right substitution, advantage is taken of the fact that direction and distance perception as well as the perception of spatial relationships are subject to a certain inertia. This can be utilized to the extent that short-term changes in the display of directions and distances of sound sources and of a spatial impression remain inaudible if they are shorter than a certain length of time and do not occur too frequently. If these two conditions can be met, the correct application of the described masking strategies results in a substantial improvement over conventional, known masking techniques.

BRIEF DESCRIPTION OF THE DRAWINGS

The invention will be described in greater detail for one embodiment thereof that is illustrated in sole drawing FIG. 1 which is a block circuit diagram for the implementation of the method according to the invention in the playback channel of a stere or multi-channel audio transmission or storage system.

DETAILED DESCRIPTION OF THE PREFERRED EMBODIMENT

Figure 1:
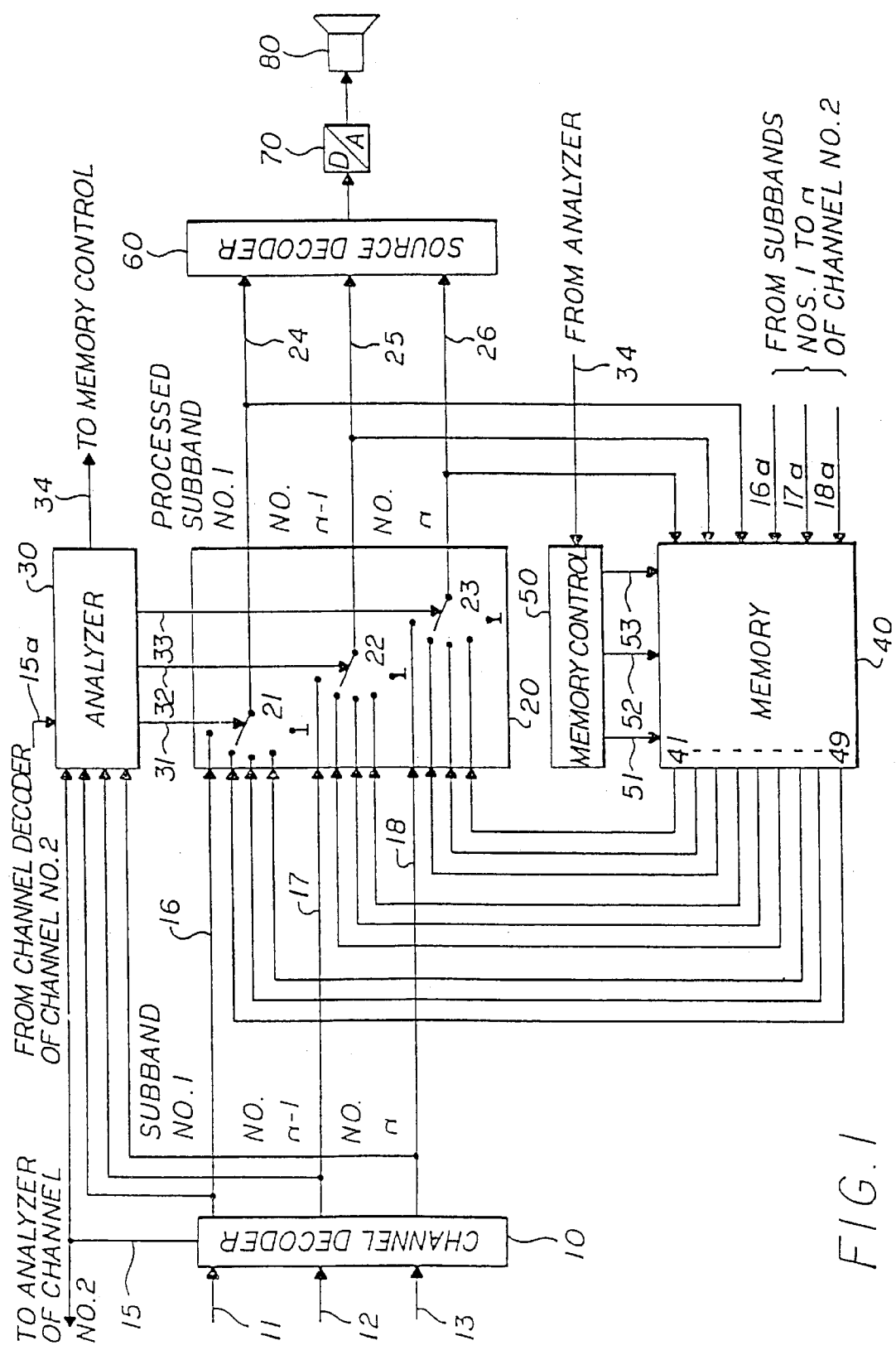

In the illustrated exemplary case, it is assumed that a digital audio signal with reduced data is transmitted or stored whose source code includes three subbands. In reality the number of subbands is considerably higher and amounts to, for example, 32 subbands.

After the digital audio signal has been read out of a memory or received over any type of transmission path, the reduced data digital audio signal under consideration—divided into its three subbands—is present at the inputs 11, 12 and 13 of a channel decoder 10. Channel decoder 10 decodes the channel code of the subband signals at its input and—insofar as this is possible—performs an error correction according to the capabilities of the respective channel code. The channel decoded subband signals are fed via outputs 16, 17 and 18 of channel decoder 10 to a multiplexing device 20 which includes, for each one of the three subbands, a multiplexer 21, 22 and 23, respectively, that is symbolized as a selector switch. Multiplexers 21 to 23 are controlled by separate outputs 31, 32 and 33, respectively, of an analyzer 30 which analyzes the channel decoded subband signals at outputs 16, 17 and 18 as to how long the interference contained therein has lasted and what type of interference it is. Moreover, analyzer 30 is connected with an output 15 of channel decoder 10 so as to obtain information about errors that channel decoder 10 was unable to correct, in Which subband signal, and at what points in time. This information is also fed to the analyzer of adjacent channel No. 2. At the same time, analyzer 30 receives the corresponding information from the output 15a of the channel decoder of adjacent channel No. 2.

According to the result of the subband specific analysis performed, the analyzer decides at which point in time and in which subband the respective multiplexer 21 to 23 is switched from the channel decoded subband signal at output 16, 17 or 18, respectively, to one of four alternatively available masking signals. The total of five different positions that can be selected for each multiplexer 21 to 23 are indicated in the drawing by the corresponding number of switch terminals on each multiplexer. The mentioned four alternatives correspond to the above-mentioned masking strategies "muting", "reseating", "left-right substitution" and "estimating". This will be described in greater detail below.

To implement the mentioned masking strategies, a memory device 40 is provided which is controlled through the outputs 51, 52 and 53 of a memory control unit 50, specifically with respect to the respective subbands. The input of the memory device is connected with the outputs 24, 25 and 26 of multiplexers 21, 22 and 23 of its own channel and with outputs 16a, 17a and 18a of the channel decoder of the adjacent channel. Memory device 40 thus stores the processed subband signals of its own channel as well as the unprocessed subband signals of the adjacent channel, with the latter signals being employed only if they do not contain interference. The processed subband signals of the own channel are employed if the "repeating-muting" masking strategy is employed, while the unprocessed subband signals of the adjacent channel are employed in the "left-right substitution" strategy. For use of the "estimating" masking strategy, memory device 40 receives corresponding estimated values from the outputs 51 to 53 of memory control unit 50, with memory control unit 50 being connected with an-output 34 of analyzer 30 through which it receives information about the subband in which the corresponding estimates are to be made at which times.

The outputs 41 to 49 of the memory device are subdivided into three groups each having three outputs, with each one of these groups being connected with an associated multiplexer 21 to 23. Each group of three outputs carries the informations for the respectively associated subband corresponding to the three mentioned masking strategies "repeating", "left-right substitution" and "estimating". To implement the fourth masking strategy "muting", a switch contact of each multiplexer 21 to 23 is symbolically connected to ground.

It is understood that multiplexer device 20 is preferably realized by computer software, which is also applicable for the remaining function blocks of the illustrated block circuit diagram.

The subband signals at outputs 24, 25 and 26 of multiplexers 21, 22 and 23, respectively, are thus subband go signals which either contain no interference or were subjected to error correction in the channel decoder or were processed by means of multiplexer device 20 according to one or several of the described masking strategies. The term "processed subband signal" is intended to indicate this fact. Multiplexer device 20 is followed by a source decoder 60 which receives the processed subband signals at outputs 24, 25 and 26. In source decoder 60, the processed subband signals are decoded to yield a digital audio signal which, after digital/analog conversion in a converter 70, can be played back, for example, by way of a channel loudspeaker 80.

It is understood that the block circuit diagram described for only one channel must be provided for every other channel of a stereo or multi-channel playback system. The alternatively possible connections in the block circuit diagrams for the individual channels have already been described.

What is claimed is:

1. A method for processing interfered-with signals retrieved from a storage medium over a channel, said signals composed of data representing a plurality of subbands comprising a media signal, said method comprising the steps of:
    decoding subband signals of said channel;
    storing in a memory means a signal portion of each subband of processed signal data for said channel;
    detecting interfered-with signal sections of each subband with an analyzer means which detects the type and length of interference;
    masking said interfered-with signal sections to form masked subband signal sections through usage of a selectable switching means for each said subband to replace said original interfered-with signal sections with a selected masking strategy by choosing from among two or more of the following alternatives:
        (i) transmitting said interfered-with signal section without correction;
        (ii) muting said interfered-with signal section by switchably selecting a ground connection;
        (iii) replacing said interfered-with signal section with said processed signal portion of each said subband of said channel stored in said memory means; or
        (iv) replacing said interfered-with signal section with an estimated signal generated by an estimation means;
    whereby said masked subband signal sections are outputted from said switching means as said processed signal data; and
    whereby said transmitted corrected signal is comprised of said processed signal data divided into subband signal sections interjected where interference has been detected and switchably replaced.

2. The method of claim 1, wherein said processed signal data is reduced or compressed data.

3. The method of claim 2, including the further step of decoding said transmitted corrected signal with a source decoder means for decompressing said reduced or compressed data whereby said source decoding means provides smoothing of transitions in said reduced or compressed data compressed data signal is processed through a source coding caused by said interjection of masked subband signal sections into said transmitted corrected signal.

4. The method of claim 2, wherein said reduced or compressed data is processed through a source coding means in the time domain and is subdivided into a plurality of subbands through subband coding.

5. The method of claim 2, wherein said reduced or compressed data signal is processed through a source coding means in the spectral or frequency domain and is subdivided into a plurality of spectral values.

6. The method of claim 1, wherein said transmitted corrected signal is a digital audio signal.

7. The method of claim 1, wherein each said selectable switching means for each said subband is independent and said masking strategies are separately selected and used for each said subband which has interference, as determined by said analyzer means.

8. The method of claim 1, wherein said decoding step includes decoding using a channel decoder means and said channel decoder means performs error correction and provides signal error information to said analyzer means.

9. The method of claim 8, wherein said channel decoder means additionally provides signal error information to a channel analyzer means for an adjacent channel.

10. The method of claim 1, wherein said memory means farther includes a memory control means which receives signals from said analyzer means, said memory control means controlling output of stored signal data from said memory means.

11. The method of claim 1, which further includes the step of fading replaced or muted interfered with signal sections into subbands of said processed signal data whereby sudden transitions between original and replaced signal data sections are avoided.

12. A method for processing interfered-with signals retrieved from a storage medium over a channel of a multiple, adjacent channel system said signals composed of data representing a plurality of subbands comprising a media signal, said method comprising the steps of:
    decoding a subband signal for a first channel;
    storing in memory a signal portion of subbands of processed signal data for said first channel;
    storing in said memory a signal portion of each said subband of unprocessed signal data for said adjacent channel;
    detecting interfered-with signal sections of subbands by detecting the type and length of interference;
    masking said interfered-with signal sections to form masked subband signal sections through a masking strategy of replacing said interfered-with signal sections with signal portions of said processed signal data from said first channel stored in said memory;
    whereby said masked subband signal sections are output as subbands of said processed signal data; and
    whereby said transmitted corrected signal is comprised of subbands with masked subband signal sections interjected where interference has been detected and replaced.

13. The method of claim 12, wherein said processed signal data is reduced or compressed data.

14. The method of claim 13, including the further step of decoding said transmitted corrected signal with a source decoder means for decompressing said reduced or compressed data whereby said source decoding means provides smoothing of transitions in said reduced or compressed data caused by said interjection of masked subband signal sections into said transmitted corrected signal.

15. The method of claim 14, wherein said masking step forms said masking subband signal sections for a length of time equaling a length of time in which interference occurs.

16. The method of claim 12, further comprising the step of dynamically selecting between a variety of masking strategies for correcting transmitted signals, said masking strategies including at least the masking strategy of replacing said interfered-with signal sections with signal portions s of said processed signal data stored in said memory.

17. The method of claim 12, wherein said masking step forms said masking subband signal sections for a length of time equaling a length of time in which interference occurs.

18. A method for processing interfered-with signals retrieved from a storage medium over a channel of a multiple, adjacent channel system, said signals composed of data representing a plurality of subbands comprising a media signal, said method comprising the steps of:
    decoding channel subband signals;
    storing in a memory means a signal portion of subbands of processed signal data for a first channel;
    storing in said memory means a signal portion of subbands of unprocessed signal data for a channel adjacent to said first channel;
    detecting interfered-with signal sections of each said subbands with an analyzer means which detects the type and length of interference;
    masking said interfered-with signal sections to form masked subband signal sections through a masking strategy of muting said interfered-with signal sections;
    whereby said masked subband signal sections are output as subbands of said processed signal data; and
    whereby said transmitted corrected signal is comprised of subbands with masked subband signal sections interjected where interference has been detected and replaced.

19. The method of claim 18, wherein said digital signal data being processed is reduced or compressed data.

20. The method of claim 19, including the further step of decoding said transmitted corrected signal with a source decoder means for decompressing said data whereby said source decoding means provides smoothing of transitions in said data signal sections into said transmitted corrected signal.

21. The method of claim 18, further comprising the step of dynamically selecting between a variety of masking strategies for correcting transmitted signals, said masking strategies including at least the masking strategy of forming masked subband signal sections by muting said interfered-with signal sections.

22. A method for processing interfered-with signals retrieved from a storage medium over a channel of a multiple, adjacent channel system, said signals composed of data representing a plurality of subbands comprising a media signal, said method comprising the steps of:
    decoding channel subband signals for decoding a first channel and an adjacent channel;
    storing in a memory means a signal portion of subbands of processed signal data for said first channel;
    storing in said memory means a signal portion of subbands of unprocessed signal data for said adjacent channel;
    detecting interfered-with signal sections of each said subband with an analyzer means which detects the type and length of interference;
    masking said interfered-with signal sections to form masked subband signal sections through a masking strategy of replacing said interfered-with signal sections with a stored signal portion of subbands of said unprocessed signal data for said adjacent channel stored in said memory means;
    whereby said masked subband signal sections are output as subbands of said processed signal data; and
    whereby said transmitted corrected signal is comprised of subbands with masked subband signal sections interjected where interference has been detected and replaced.

23. The method of claim 22, wherein said processed signal data is reduced or compressed data.

24. The method of claim 23, including the further step of decoding said transmitted corrected signal with a source decoder means for decompressing said reduced or compressed data whereby said source decoding means provides smoothing of transitions in said reduced or compressed data caused by said interjection of masked subband signal sections into said transmitted corrected signal.

25. The method of claim 22, further comprising the step of dynamically selecting between a variety of masking strategies for correcting transmitted signals, said masking strategies including at least the masking strategy of masking subband signal sections by replacing said interfered-with signal sections with a stored signal portion of subbands of said unprocessed signal data for said adjacent channel stored in said memory means.

26. The method of claim 22, wherein said masking step forms said masking subband signal sections for a length of time equaling a length of time in which interference occurs.

27. An apparatus for processing interfered-with digital signals retrieved from a storage medium, said signals composed of data representing a plurality of subbands comprising a media signal, said apparatus comprising:
    a channel decoder means for decoding said subband signals for said channel;
    a memory storage means for storing a processed signal portion of each said subband for said channel;
    a memory storage means for storing an unprocessed signal portion of each said subband of an adjacent channel;
    an analyzer means for detecting interfered-with signal sections of each said subband and for determining the type and length of said interference;
    a switching means associated with each said subband for selectably switching in a replacement signal for said original interfered-with signal section for each said subband by choosing from among the following alternatives:
        (i) said original signal section with no replacement;
        (ii) a muted signal section formed by a ground connection;
        (iii) a processed signal portion of said subband of said channel from said memory means;
        (iv) an unprocessed signal portion of said subband of said adjacent channel from said memory means; or
        (v) an estimated signal generated by an estimation means;
    whereby said replacement signal sections are outputted from said switching means as said processed subband signal data; and whereby said processed digital signal is comprised of said digital signal divided into subbands with replaced sections switchably interjected where interference has been detected.

28. The apparatus of claim 27, wherein said digital signal data being processed is reduced or compressed data.

29. The apparatus of claim 28, includes a source decoder for decompressing said processed subband signal data whereby said source decoding means provides smoothing of s transitions in said data caused by said interjection of masked subband signal sections into said transmitted corrected signal.

30. The apparatus of claim 28, wherein said reduced data signal is processed through a source coding means in the time domain and said signal is subdivided into a plurality of said subbands through subband coding.

31. The apparatus of claim 28, wherein said reduced data signal is processed through a source coding means in the spectral or frequency domain and said signal is subdivided is into a plurality of spectral values, instead of said subbands, through transformation coding.

32. The apparatus of claim 28, wherein said channel decoder means additionally provides signal error information to said adjacent channel analyzer means.

33. The apparatus of claim 27, wherein said digital signal is a digital audio signal.

34. The apparatus of claim 27, wherein each said selectable switching means for each said subband is independent and said masking strategies are separately selected and used for each said subband which has interference, as determined by said analyzer means.

35. The apparatus of claim 27, wherein said channel decoder means performs error correction and provides signal error information to said analyzer means.

36. The apparatus of claim 27, wherein said memory means further includes a memory control means which receives signals from said analyzer means, said memory control means controlling outputs of said stored signal data from said memory means.

37. The apparatus of claim 27, which further includes a fading means for fading said replaced signal sections into said processed subband signal data whereby sudden transitions between original and replaced signal data sections are avoided.

38. The apparatus of claim 27, wherein said switching means is a multiplexer.

39. In a method for processing interfered-with signals retrieved from a storage medium over a channel of a multiple, adjacent channel system said signals composed of data representing a plurality of subbands comprising a media signal, the improvement comprising:
    detecting interfered-with signal sections of at least one subband of a retrieved signal; and,
    selectably replacing at least one interfered-with signal section of at least one subband by choosing dynamically one of a variety of masking strategies for independently selected subbands.

40. In the method of claim 39, the improvement further comprising the step of determining at least one of a type and length of interference, said replacing step choosing one of said strategies based on at least one of said type and length of interference.

41. In the method of claim 39, the improvement further comprising:
    estimating a corrected signal for at least one subband of the retrieved signal; and
    replacing the interfered-with signal section with said corrected signal.

42. In the method of claim 39, the improvement furthers comprising:
    storing a processed signal section for at least one subband; and
    replacing the interfered-with signal section with said processed signal section for at least one subband.

43. An apparatus for processing interfered-with signals retrieved from a storage medium over a channel of a multiple, adjacent channel system said signals composed of data representing a plurality of subbands comprising a media signal, the improvement comprising:
    a detector for detecting interfered-with signal sections of at least one subband of a retrieved signal; and
    a switch for selectable replacing at least one interfered-with signal section of at least one subband by choosing dynamically one of a variety of masking strategies for independently selected subbands.

44. In the apparatus of claim 43, the improvement further comprising an analyzer for determining at least one of a type and length of interference, said switch choosing one of said strategies based on at least one of said type and length of interference.

45. In the apparatus of claim 43, the improvement further comprising:
    an estimator for estimating a corrected signal for at least one subband of the retrieved signals, said switch replacing the interfered-with signal section with said corrected signal.

46. In the apparatus of claim 43, the improvement further comprising:
    memory for storing a processed signal section for at least one subband, said switch replacing the interfered-with signal section with said processed signal section for at least one subband.

* * * * *

UNITED STATES PATENT AND TRADEMARK OFFICE
CERTIFICATE OF CORRECTION

PATENT NO. : 6,351,727 B1
APPLICATION NO. : 09/567647
DATED : February 26, 2002
INVENTOR(S) : Detlev Wiese et al.

It is certified that error appears in the above-identified patent and that said Letters Patent is hereby corrected as shown below:

Title Page

Item (63) Related U.S. Application Data
Delete "on Jan. 26, 1993, now abandoned, which is a continuation of application No. PCT/EP92/00754, filed on Apr. 3, 1992." and insert --as application No. PCT/EP92/00754, Apr. 3, 1992, abandoned.-- therefor.

Item (30) Foreign Application Priority Data
Delete "Apr. 5, 1991" and insert --Apr. 6, 1991-- therefor.

Column 1, lines 11-12, delete "which claims priority through PCT/EP92/00754" and insert --which is a national stage application of PCT/EP92/00754-- therefor.

Column 1, line 12, delete "Apr. 34" and insert --Apr. 3-- therefor.

Signed and Sealed this

Thirty-first Day of March, 2009

JOHN DOLL
*Acting Director of the United States Patent and Trademark Office*